J. L. ROBERTS.
PEDIGREE TRAP NEST AND FLOCK CULLER.
APPLICATION FILED OCT. 5, 1920.

1,417,631.

Patented May 30, 1922.
3 SHEETS—SHEET 1.

Inventor
James L. Roberts

Attorneys

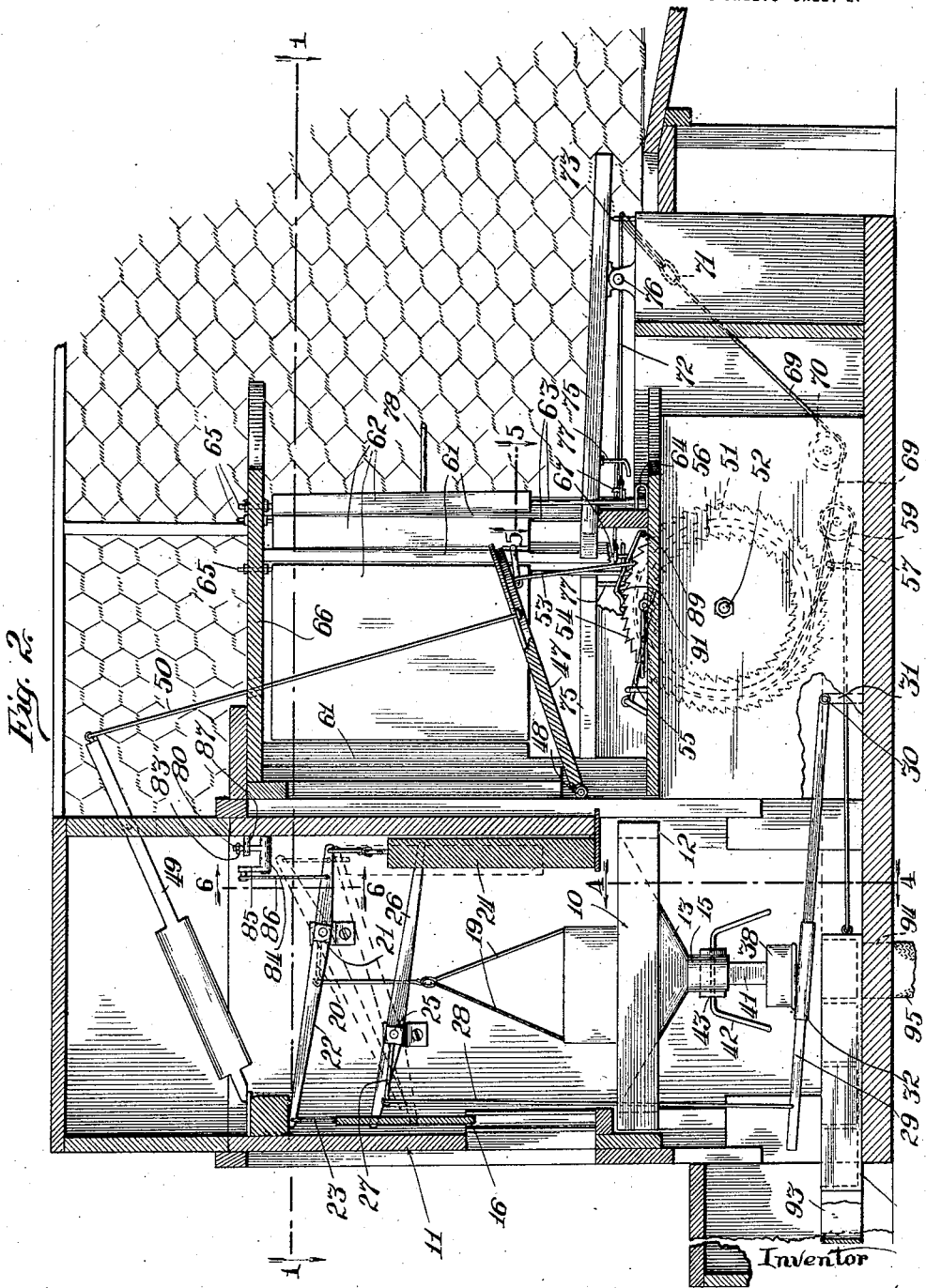

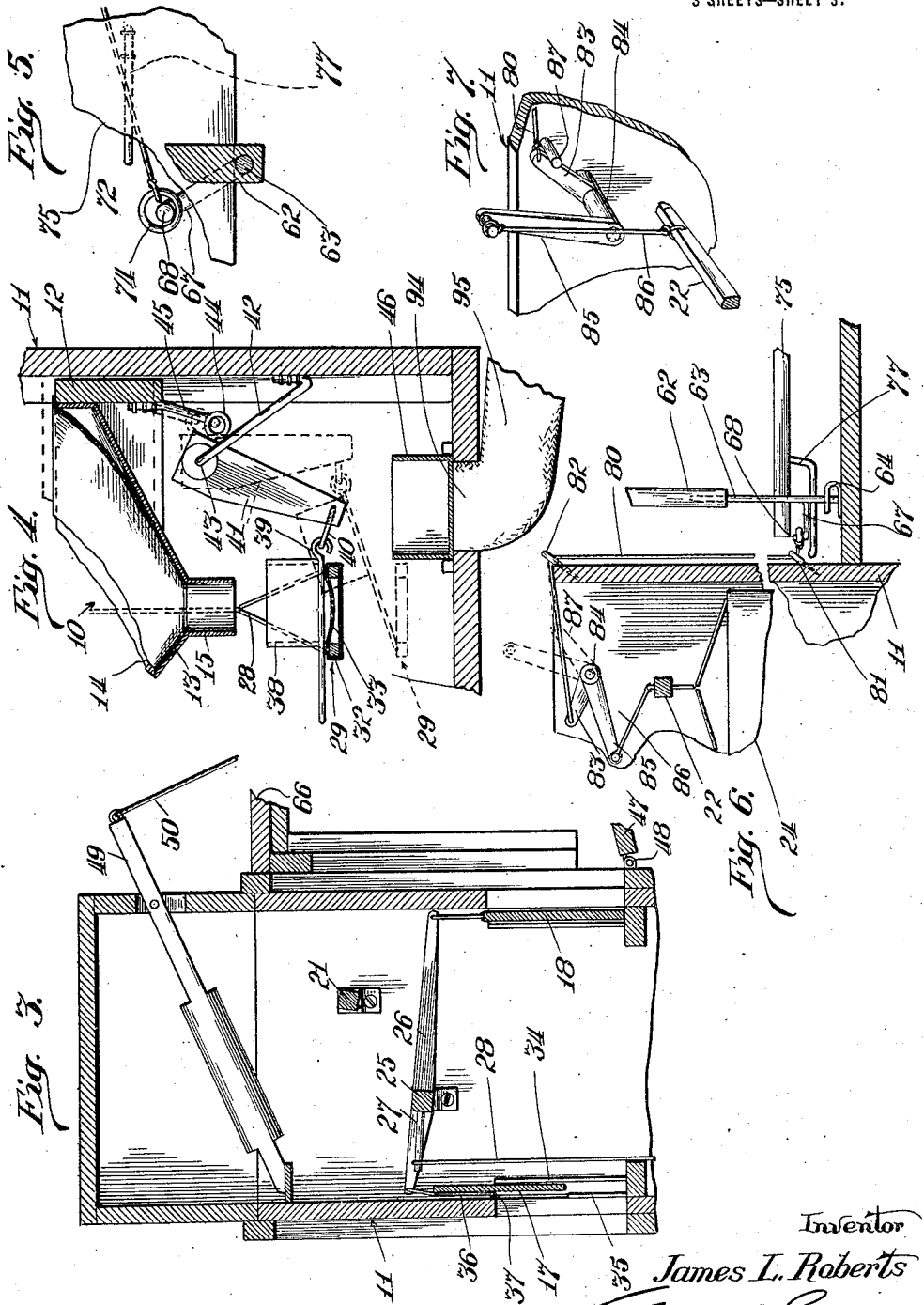

UNITED STATES PATENT OFFICE.

JAMES L. ROBERTS, OF GORIN, MISSOURI.

PEDIGREE TRAP NEST AND FLOCK CULLER.

1,417,631.  Specification of Letters Patent.  Patented May 30, 1922.

Application filed October 5, 1920. Serial No. 414,839.

*To all whom it may concern:*

Be it known that I, JAMES L. ROBERTS, a citizen of the United States, and resident of Gorin, county of Scotland, and State of Missouri, have invented certain new and useful Improvements in Pedigree Trap Nests and Flock Cullers, of which the following is a specification, and which are illustrated in the accompanying drawings, forming a part thereof.

The invention relates to a device in the nature of a trap nest; and has for an object the provision of such a device that will cause a hen that enters the nest but does not lay to return to the pen where she came from; that will allow each hen that enters the nest and lays, to pass to and be confined in an individual compartment or pen; that will keep the eggs separated, each egg being so placed as to make it possible to identify the hen that laid it; that will be closed so that no more hens may enter when all of the individual pens are occupied by hens that have laid; that may be also utilized to allow any number of hens to pass through the nest and lay successively without individual identification of their eggs so as to merely cull the laying from the non-laying members of a flock, the hens that enter but do not lay being returned to their original enclosure.

An illustrative embodiment of the invention is shown in the accompanying drawings in which—

Fig. 2 is a vertical section on broken line 2—2 of Fig. 1;

Fig. 3 is a detail vertical section on line 3—3 of Fig. 1;

Fig. 4 is a detail vertical section on line 4—4 of Fig. 2;

Fig. 5 is a detail horizontal section on line 5—5 of Fig. 2;

Fig. 6 is a detail vertical section on line 6—6 of Fig. 2;

Fig. 7 is a detail perspective view of a locking rock shaft; and

Figures 1, 8:
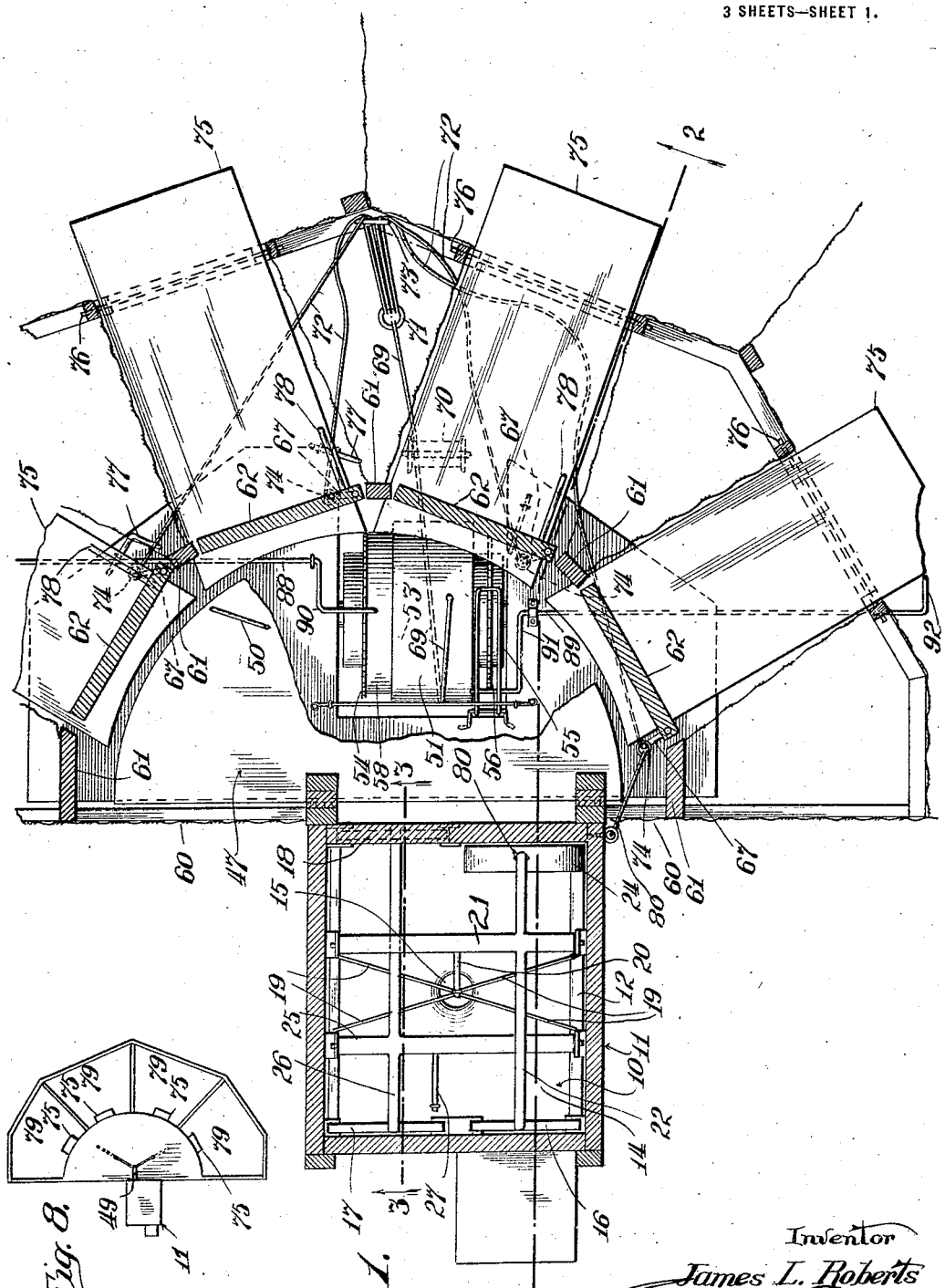
Fig. 1 is a horizontal section on line 1—1 of Fig. 2, with parts broken away to show some of the mechanism in plan view.
Fig. 8 is a diagrammatic plan view of a complete device drawn to a very much reduced scale.

In the form of the invention shown, a nest 10 is suspended in a nest box 11. The nest comprises a frame 12 supporting a funnel shaped nest 13 having a fabric lining 14. The nest member 13 has an opening at its apex provided with a discharge tube 15.

To control the movements of the hen there are shown one entrance door 16 and two exit doors 17 and 18. The entrance door may be controlled by the weight of the hen and the exit doors by the weight of the egg. To suspend the nest in such a manner as to actuate the entrance door 16 bridles 19 are shown attached to the nest frame and to an arm 20 projecting from a rock shaft 21. To control the door 16 a walking beam 22 is carried by the rock shaft 21 and the door 16 is suspended from one end thereof as at 23 and a weight 24 is suspended from the other end thereof. The weight 24 must be sufficient to lift both the door 16 and the nest 10. When a hen steps into the nest the entrance door 16 will be closed and she must escape by one of the exit doors.

To support the exit doors so that one of them shall be always open while the other is closed, there is provided a second rock shaft 25 carrying a walking beam 26 from the ends of which the exit doors 17 and 18 may be suspended. To operate the exit doors so that the direction of exit of the hen will be controlled by the event of her having or not having laid an egg, an arm 27 extending from the rock shaft 25 may be connected, by a string 28, with the end of a lever 29 fulcrumed at 30 to a post 31. As more clearly indicated in Fig. 4 the lever 29 is preferably formed as an open frame having side members 32 and a sling 33 of fabric may be secured to the side members for reception of the eggs as they drop through the spout 15 without injury to the egg. When an egg lies upon the sling 33 the exit door 17 will be held closed and the door 18 will be open. The end of the walking beam 26 to which the door 18 is connected is enough longer than the end to which door 17 is connected, and also than arm 27, so that the door 18 may normally stand closed and hold door 17 and lever 29 elevated. This condition is reversed by the weight of an egg upon lever 29.

While a hen is on the nest a second hen must not be allowed to enter, therefore the exit door 17 is shown only half raised when in its elevated position and has a stop 34 extending from the bottom of the door opening substantially to its top. A hen attempting to push her way in from the outside will find the door immovable inwardly. The stop 35 on the outside of the door, however, extends only to a point below the lower edge of the door 17 in its elevated position. The member 36 which suspends the door 17 is fastened to the door below its upper edge as at 37 so that the upper edge of the door may be free to swing inwardly when a hen attempts to pass out. If a hen enters the nest and desires to get out without having laid an egg the only avenue of escape will be under the half opened door 17. When she puts her head through this opening and attempts to pass out, the lower edge of the door will swing freely outward and permit the exit of the hen, after which it will be returned to position by the action of gravitation. However, if she lays an egg the door 17 will be closed and the door 18 open, when she can only pass out through door 18.

To remove the egg from the sling 33 an open bottomed basket 38, preferably a wire frame covered with cloth, may be provided. The bottom member of the frame of the basket is shown as projecting beyond the basket in one direction and as provided with eyes 39 engaging a link 40 at the other side of the basket. The link 40 in turn engages a lever 41 pivoted to a bracket 42 as at 43. An eye 44 secured to the lever 41 adjacent its pivot is shown as engaged by a member 45 rigidly secured to the frame 12 of the nest. When the nest is lowered by the weight of the hen the basket will be projected to the position shown in full lines in Fig. 4, in which position an egg falling on sling 33 will be surrounded by the basket. When the nest rises as the hen leaves, the basket will be pulled to the dotted line position in Fig. 4 and the egg, if one has been laid, will fall through the basket into any suitable receptacle as a tray 46, shown as divided into compartments of a number equal to the number of hens which the machine is to accommodate without attention.

To operate the mechanism for opening the doors to the individual pens successively and for shifting the egg tray 46, there is shown a platform 47 outside the exit door 18 which platform is pivoted as at 48 and normally held in a slightly elevated position by means of a weighted lever 49 and connections 50. A spring may be substituted for this arrangement, if desired. A drum 51 mounted to revolve on an axis 52 may be caused to revolve a given distance each time a hen steps upon the platform 47, by means of a pawl 53 acting on ratchet 54. A second pawl 55 and ratchet 56 are indicated, the function of which is to prevent retrograde movement of the drum 51.

To pull the egg tray 46 forward a distance equal to the width of one compartment at each movement of the platform, a string 57 may be secured to a portion 58 of the drum, may pass about a pulley 59 and be secured to the egg tray.

To keep the successive hens separate after laying so as to permit of identification with their respective eggs, the space above the platform 47 may be enclosed as shown by wire netting 60, door frames 61 and doors 62. The doors may each be pivoted upon a rod as 63 projecting downwardly and stepped in a member 64 and a second rod 65 projecting upwardly through the upper member 66 of the door frame. The member 66 may be of sufficient extent to enclose the entire space above the platform 47. To actuate the doors each rod 63 is shown as provided with an arm 67 projecting therefrom and having a turned up extremity 68. A string 69 may be passed about and secured to the drum 51 and under a pulley 70 said string having a ring 71 tied upon its free end. Secured to the ring 71 are a series of strings 72 passing through an eye 73 and each in turn having a ring 74 tied upon its free end, which rings may each be placed over the extremity 68 upon the door which it is designed to operate. The string connecting the door to be opened first is the shortest and each succeeding string is longer, therefore when the drum 51 is revolved the strings will be successively pulled upon to open the doors. The portions of the drum 51 about which strings 57 and 69 are wound may vary in diameter to provide the necessary amount of motion to the egg tray and to the doors with a given amount of revolution of the drum.

To allow the doors to close after the hen has passed through, there is shown a treadle 75 outside of each door, over which treadle the hen must pass. Each treadle is pivoted as at 76 and has a wire 77 secured to its inner end and standing in a position to lie just below the ring 74 when the door is open. When the hen steps on the outer end of the treadle the inner end will rise and the wire 77 will lift the ring 74 off from the extremity 68 thus releasing the door. Any suitable means may be utilized to give the door a tendency to close when freed. As shown in Fig. 2, the doors stand out of plumb and will swing shut by gravity when free to do so. An arm 78 may be provided projecting from each door except the last of the series which arm will stand in front of the next door in the series when the door carrying the arm is open, thus preventing the accidental opening of the next door inopportunely.

Each door 62 gives access to a separate enclosure 79 from which enclosures the hens cannot escape until an attendant releases them, when he may identify the hen which has laid the egg found in the corresponding compartment of the tray 46.

To close the entrance door 16 when the hen passes into the last enclosure 79 of the series, the ring 74 which operates the last door 62 has a string 80 attached thereto, which string passes through eyes 81 and 82 and is attached to a crank 83 projecting from a rock shaft 84. A second crank 85 projects from the rock shaft 84 which crank is connected with the walking beam 22 by means of a cord 86. When the weight 24 is lifted by the action of the nest the cord 86 will merely slacken. When the ring 74 is moved to open the last door 62, the rock shaft will be turned until the crank 85 passes the perpendicular, lifting the weight 24 and closing the entrance door 16. A stop 87 is shown which will prevent the revolution of the rock shaft 84 under influence of the weight 24 when the crank 85 has passed the center.

To enable the strings 57 and 69 to be unwound for purposes of resetting the device, wires 88 and 89 are shown mounted for revolution about their axes, each having a crank end as 90, 91 underlying one of the pawls 53, 55. As shown at 92 these wires terminate, at their projecting ends, in an angular extension which may be depressed to lift the pawls. If desired a weight may be hung upon the ends 92 to hold the pawls elevated while replacing the rings 74 and returning the egg tray to starting position.

When it is desired to utilize the device as a flock culler only, without identification of the individual hen with her egg, it is desirable that the exit doors be still controlled by the eggs. To this end an added compartment 93 may be provided in the egg tray which compartment is without a bottom and an opening 94 may be formed in the bottom of the device with an egg chute 95 in communication therewith. To use the device as a flock culler it is only necessary to depress the platform normally one step beyond its normal action to draw the open bottomed compartment of the tray into position to receive the eggs, to open one of the enclosures 79 and its door 62, so that the laying hens can escape into a separate pen and to secure the pawls 53 and 55 in a raised position as by hanging weights on the ends 92 of the wires 88, 89. The egg chute 95 may be arranged to deliver to any suitable receptacle, not shown.

Many minor changes may be made in the physical embodiment of the invention without departing from its spirit.

I claim:

1. A trap nest and flock culler comprising, in combination, a nest box, a nest in said box having an opening in the bottom thereof, an entrance door in said box, a plurality of exit doors in said box, one of said exit doors adapted to normally allow exit but prevent entrance of a hen therethrough, means actuated by the weight of a hen to close said entrance door, means actuated by the pressure of an egg to close said normally open exit door and to open a normally closed exit door.

2. A trap nest and flock culler comprising, in combination, a nest box, a series of enclosures, an entrance door in said box, an exit door in said box, a series of entrance doors for said enclosures, means to close said box entrance door when a hen is in the box, means to open said exit door when an egg is laid and means to open said enclosure entrance doors successively as successive hens pass through said exit door.

3. A trap nest and flock culler comprising, in combination, a nest box, a series of enclosures, an entrance door in said box, an exit door in said box, a series of entrance doors for said enclosures, means to close said box entrance door when a hen is in the box, means to open said exit door when an egg is laid, and means to close said box entrance door when the last of the series of enclosure entrance doors is opened.

4. A trap nest and flock culler comprising, in combination, a nest box, entrance and exit doors in said box, means to close said entrance door while there is a hen in the box, means controlled by the presence of an egg to control said exit door, a movable platform exterior of said exit door, a series of enclosures adjacent said platform, a series of entrance doors for said enclosures, and means actuated by movement of said platform for successively opening said doors to permit access to successive enclosures of said series.

5. A trap nest and flock culler comprising, in combination, a nest box, entrance and exit doors in said box, means to close said entrance door while a hen is in the box, means controlled by the presence of an egg to control said exit door, a movable platform exterior of said exit door, a series of enclosures adjacent said platform, a series of entrance doors for said enclosures, and means actuated by movement of said platform for successively opening said doors to permit access of successive hens to successive enclosures of said series, and means to store successive eggs laid in said box preserving the order in which they are laid.

6. A trap nest and flock culler comprising, in combination, a nest box, an entrance and a plurality of exit doors in said box, a vertically movable nest in said box, means actuated by lowering of said nest under the weight of a hen to close said entrance door, an egg spout in the bottom of said nest, a lever below said spout, means actuated by movement of said lever under weight of an egg to actuate said exit doors to determine the direction of exit of a hen by the event of her having laid or not having laid an egg, means to store the eggs separately in the order as laid and means to separately confine hens which lay in the nest box.

7. A trap nest and flock culler comprising, in combination, a nest box, an entrance and a plurality of exit doors in said box, a vertically movable nest in said box, means actuated by lowering of said nest under the weight of a hen to close said entrance door, an egg spout in the bottom of said nest, a lever below said spout, means actuated by movement of said lever under weight of an egg to actuate said exit doors to determine the direction of exit of a hen by the event of her having laid or not having laid an egg, and means actuated by vertical movement of said nest to remove an egg from said lever.

8. A trap nest and flock culler comprising, in combination, a nest box, an entrance and a plurality of exit doors in said box, a vertically movable nest in said box, means actuated by lowering of said nest under the weight of a hen to close said entrance door, an egg spout in the bottom of said nest, a lever below said spout, means actuated by movement of said lever under weight of an egg to actuate said exit doors to determine the direction of exit of a hen by the event of her having laid or not having laid an egg, means actuated by vertical movement of said nest to remove an egg from said lever, means having a plurality of compartments to receive eggs from said removing means, a vertically oscillatable platform exterior of the exit door opened when an egg is laid, means actuated by oscillation of said platform by presence of a hen thereon to shift said means having a plurality of compartments so that successive eggs will be received in successive compartments, a series of enclosures and means controlled by movements of said platform to open said enclosures successively.

9. A trap nest and flock culler, comprising in combination, a nest box, a plurality of doors in said box, means to be governed by the weight of an egg to open one of said doors, a movable platform exterior of said governed door, a winding drum, means operated by movement of said platform to turn said drum step by step, a series of compartments having doors adjacent said platform, means operated by said drum to successively open said doors, and means operated by said drum to move a storage means to separately store the eggs whereby each egg can be identified with the hen that laid it.

10. A trap nest and flock culler, comprising in combination, a nest box, a plurality of doors in said box, means to be governed by the weight of an egg to open one of said doors, a movable platform exterior of said governed door, a winding drum, means operated by movement of said platform to turn said drum step by step, a series of compartments having doors adjacent said platform, means operated by said drum to successively open said doors, a treadle exterior of each door of the series adapted to disconnect said opening means from that door, and means operated by said drum to move a storage means to separately store the eggs whereby each egg can be identified with the hen that laid it.

11. A trap nest and flock culler comprising, in combination, a nest box, a series of enclosures, an entrance door in said box, an exit door in said box, a series of entrance doors for said enclosures, means operated by the weight of the hen for closing said box entrance, means actuated by the weight of an egg for opening said exit door, and positive means operated by the closing of the last of said enclosure entrance doors for closing said box entrance door.

JAMES L. ROBERTS.